INVENTORS
Ernst A. B. Eliasen
Kaj H. F. Jensen
BY
ATTORNEY

June 23, 1953 E. A. B. ELIASEN ET AL 2,643,292

TELEGRAPHIC CODE TRANSLATOR

Filed March 6, 1951 6 Sheets-Sheet 2

INVENTORS
Ernst A. B. Eliasen
Kaj H. T. Jensen
BY

ATTORNEY

June 23, 1953 E. A. B. ELIASEN ET AL 2,643,292

TELEGRAPHIC CODE TRANSLATOR

Filed March 6, 1951 6 Sheets-Sheet 3

INVENORS
Ernst A. B. Eliasen
Kaj H. F. Jensen
BY
[signature]
ATTORNEY

June 23, 1953 E. A. B. ELIASEN ET AL 2,643,292

TELEGRAPHIC CODE TRANSLATOR

Filed March 6, 1951 6 Sheets-Sheet 4

INVENTORS
Ernst A. B. Eliasen
Kaj H. F. Jensen
BY
ATTORNEY

INVENTORS
Ernst A. B. Eliasen
Kaj H. F. Jensen
BY
ATTORNEY

INVENTOR
Ernst A. B. Eliasen
Kaj H. F. Jensen
BY
[signature]
ATTORNEY

Patented June 23, 1953 2,643,292

UNITED STATES PATENT OFFICE 2,643,292

TELEGRAPHIC CODE TRANSLATOR

Ernst Aksel Borge Eliasen and Kaj Herman Frederik Jensen, London, England

Application March 6, 1951, Serial No. 214,103
In Great Britain March 13, 1950

12 Claims. (Cl. 178—26)

The present invention relates to a method of and apparatus for translating telegraphic records consisting of Wheatstone (Morse) characters or cable code characters on punched paper tape (hereinafter called the Wheatstone code), into signals or records based on the five-unit start-stop code and is particularly concerned with a telegraphic transmitter adapted to transmit signals by the five-unit start-stop code from Wheatstone (code) characters recorded on punched paper tape.

For the performance of such a translation the difficulty would be encountered that the five-unit code involves what may be termed shift key code symbols, which must be interpolated whenever a change from letter symbols to figure or sign symbols or vice versa is involved, since in the five-unit code the same arrangement of impulses may represent two separate symbols, the appropriate symbol to be reproduced being selected by the shift key mechanism. In the Wheatstone code, on the other hand, each figure, letter or sign is represented by a different arrangement of the dots and dashes comprising the code. Hence translation and direct transmission of the translated code symbols has not heretofore been possible in a simple manner owing to the necessity for introducing the shift key symbols into the transmitted signals whenever a change from letters to figures or signs, or vice versa occurs.

Thus if, for example, it is desired to transmit signals from submarine cable or radio circuits operated by the Wheatstone code, to a teleprinter circuit, the intervention of an operator has been necessary to effect transmission into the teleprinter circuit.

The present invention has for its object to provide a satisfactory and reliable method of and means for permitting translation and direct transmission of five-unit code signals from a punched tape bearing Wheatstone code symbols and it comprises a method of and apparatus for performing such translation and transmission.

The method according to the invention comprises means for intermittently feeding tape bearing Wheatstone code symbols and for examining each successive symbol, translating the symbols into five-unit code signals, momentarily interrupting the tape feed whenever a change from letters to figures or signs or vice versa occurs in the recorded symbols, causing the transmission of the appropriate shift key signal whenever such a change occurs and thereafter transmitting the symbol which caused the interruption of the tape feed.

The apparatus according to the invention comprises means for transmitting five-unit code signals under the control of symbols punched on a tape according to the Wheatstone code, said tape being fed stepwise through the apparatus so as to translate the successive Wheatstone code symbols into five-unit code signals, means operative for each successive symbol to determine whether a shift-key signal must be interpolated, and means operative in the event of a shift-key signal being required to arrest the tape feed while the said shift-key signal is transmitted, after which the signal representing the symbol concerned is transmitted.

Such apparatus conveniently comprises a series of notched discs capable of slight relative rotation under the control of the punch holes in the tape, the notches being appropriately distributed as in the well known type of Wheatstone printer so that for every character on the tape any one of a plurality of bell cranks is allowed to drop, and in operative engagement with said arms or cranks is a notched disc (the shift key selector disc) the teeth of which are selected so that it rotates from one position to another position whenever, following the movement of a crank corresponding to a letter symbol, the next crank to move represents a numeral or sign or vice versa, and said latter notched disc is adapted to stop the tape feed for one cycle of the apparatus. Such cranks also co-operate with two series each of five notched discs (pertaining to letters and to numerals or signs respectively) so that, after the movement of any crank one or more discs in each group is/are adapted to move, and by such movement to effect the transmission of the five-unit code signals. At any particular moment however all the five discs of one series are blocked from movement and such blocking is controlled by the action of the shift selector disc. The two series of five discs are moreover so designed that, in respect of each series, the movement of a bell crank which requires the transmission of a shift key signal, besides shifting the shift key selector disc to its other position (in each case), also permits the transmission of a common shift key signal appropriate to the change concerned, and this transmission occurs while the tape feed mechanism is locked. This transmission is immediately followed by the reversal of the blocking means to release the series of discs previously out of use and to block the series previously in use, whereafter, with the same arm or crank displaced (the tape feed having been blocked) the now-released series of discs transmits the correct code for the signal recorded on the tape. It will of course be appreciated that this sequence of events only occurs when the tape records a signal representing a change from, say, letters to numerals or conversely; while a sequence of letters (or of numerals) is translated and transmitted step by step without interruption. On the other hand the movement of any numeral bell crank after one or more letters, always transmits first the same common five-unit shift key signal and secondly the five-unit signal pertaining to that numeral; and likewise, first a common shift key signal followed by a characteristic signal for a letter following a numeral.

The various features of the present invention and the method of operation thereof will be more fully understood from consideration of the following description of one constructional form thereof described as consisting of a modification of a Wheatstone printer, wherein the printing integers are replaced by the parts to be described in detail. The accompanying drawings illustrate this form of the invention wherein.

Figure 1:
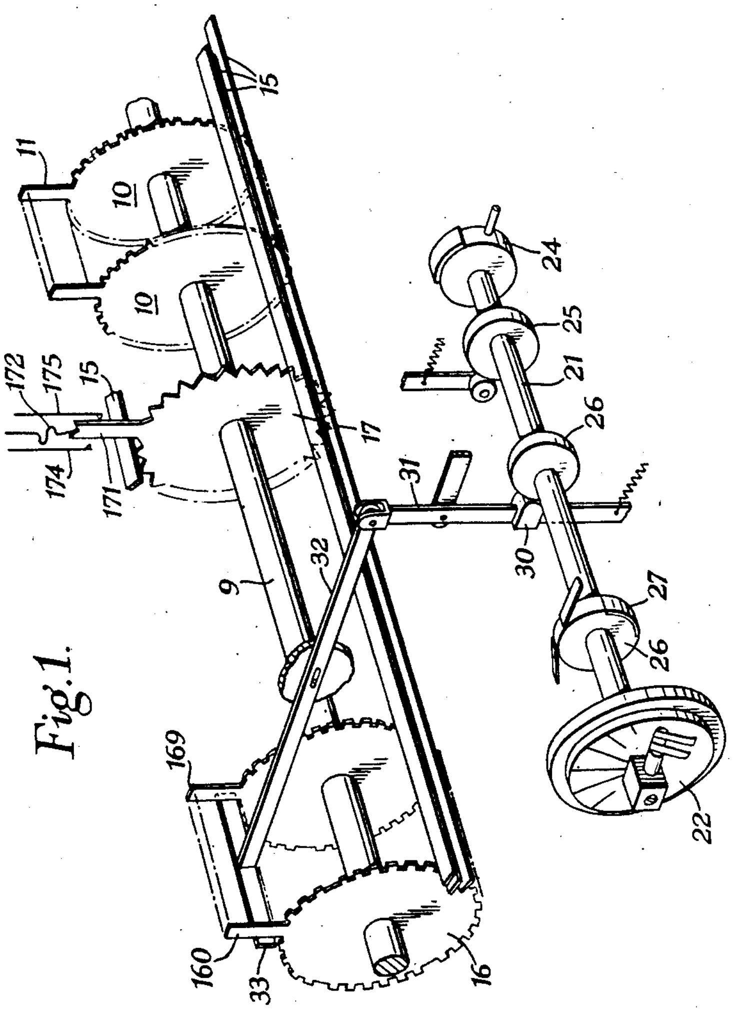
Fig. 1 is an explanatory perspective view showing the operation of the apparatus.

As previously indicated the constructional form of the invention shown on the drawings is based on the use of certain standard parts of a Wheatstone printer, these parts comprising a set of 20 Wheatstone selector discs or "combs" 10, the end elements only of which are shown in Fig. 1, for greater clarity. These discs are mounted on a carrier bar 9 and provided with lugs 11 connected to selector rods 12 indicated in group form in Fig. 3, and operated in turn by selector pins engageable with apertures in the tape 13 presented over the selector pins in the tape guide 14. Each symbol on the tape is explored in turn by the selector pins, which are advanced during the course of each operation so that those pins which meet punch holes in the tape are allowed to rise thereby initiating movement of the selector or selectors 12 concerned to rotate one or more of the discs 10 according to the symbol recorded on the tape for each operation. At the completion of such operation the tape is fed forward to present a new symbol to the selector pins—and so on for successive symbols.

The displacement of the one or more discs 10, by reason of the permutational notching of their peripheries, permits one (and one only) of a plurality of bell cranks 15 (Figs. 1 and 3) spaced uniformly all around the discs 10, to move inwardly; it being understood that for every different character recorded on the tape a different crank will be free to move. In the case of a printer these cranks are adapted to control the selection of type characters to effect printing.

In accordance with the present invention the arms or cranks 15 are also in operative relation with ten notched discs 16 the end elements only of which are indicated in Fig. 1, and which are to be regarded as consisting of two groups of five discs each, the one group controlling the transmission of five-unit code impulses for letters and the other controlling the transmission of five unit code impulses for numerals or signs; a shift selector disc 17 is also provided and is in operative connection with the arms or cranks 15 as explained hereinafter.

The operation of the mechanism so far described is as follows: after the tape has been fed into the detecting position, the selector pins are presented to the tape with the result that one or more of the discs 10 is/are moved through the rods 12 after which one of the cranks 15 is allowed to move, the particular arm being that corresponding to the tape symbol. The movement of the disc 16 of either group is actually blocked by a blocking slide 18 Figs. 2 and 3) engaging lugs 160 to 169 of the discs 16 while the discs of the other group are free to move, and it is preferred to arrange the discs of the two groups in alternating sequence. The movement of the crank 15 brings it into operative engagement with the discs 16 with the result that the discs 16 in one group, according to the position of the blocking slide 18, are free to move and one or more of them move in fact according to which crank 15 has moved. The movement of the disc or discs 16 so selected operates contact means which control the timed transmission of five-unit signals through a synchronising commutator 22.

Figure 8:
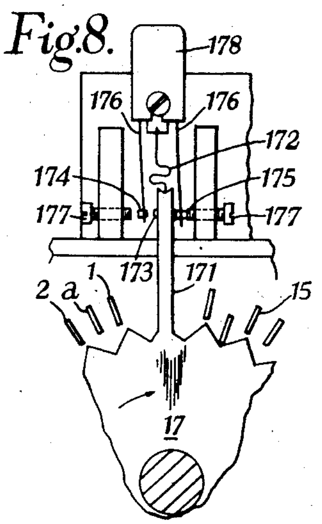
Fig. 8 is a detail view showing the operation of the shift key selector disc and associated parts.

It is convenient, and normal practice, to arrange the cranks 15 in such manner that letters and numerals or signs come alternately around the groups of discs 10 and 16 and in this case the shift selector disc 17 comprises a toothed disc with teeth having inclined flanks of pitch equal to twice the spacing between successive cranks 15; hence referring to Fig. 8, and assuming a series of letters are in course of translation by the apparatus, the disc 17 is not moved throughout such series. Immediately a numeral is received however, the crank 15 concerned will strike a flank of one of the teeth of the disc 17 which will then be moved over to its alternative position.

The full sequence of operation on movement of the disc 17 will be more fully explained hereinafter, it will suffice for the present to say that the tape feed mechanism is stopped and at a later stage in the operating cycle the blocking slide 18 is reversed in position. Considering however the events immediately following movement of the disc 17, the movement of the arm or crank initiating such movement also allows movement of the disc group 16 which is still free i. e. with the blocking slide 18 still in its former position, and the particular arrangement of the teeth thereof is selected in such manner that in the circumstances considered the common five-unit code is transmitted which comprises the shift-key signal for preparing the remote instrument for the reception of the particular symbol. Thereafter the five-unit code characteristic of the symbol is transmitted. Thus assuming the apparatus has dealt with a series of letters which have been translated normally by the action of the integers 10, 15 and 16, on the detection of a numeral symbol on the tape 13, the movement of the crank 15 corresponding to that numeral results in shifting the disc 17, the stoppage of the tape feed for one cycle of operation, and the transmission from the group of discs 16 previously in use of the relevant common shift key impulse. Thereafter the blocking slide 18 is reversed to prevent movement of the discs 16 previously in use (for letter selection) and to release the other group of discs 16 (for numeral or sign selection), which with the same arm or crank 15 in the shifted position, now transmit, at the next working cycle, the characteristic five-unit code signal for the particular numeral involved.

Precisely similar actions are involved when a letter follows one or more numerals, the disc 17 reverts to its former position, the tape feed mechanism is stopped, the discs 16 previously in use (the numeral discs) transmit a common shift key code to prepare the receiving mechanism for letters, the blocking slide 18 reverses to its former position, holding the numeral discs 16, and releases the letter discs, which now transmit the characteristic five-unit code for the letter concerned, and the tape mechanism is restarted for detecting successive symbols.

Figure 2:
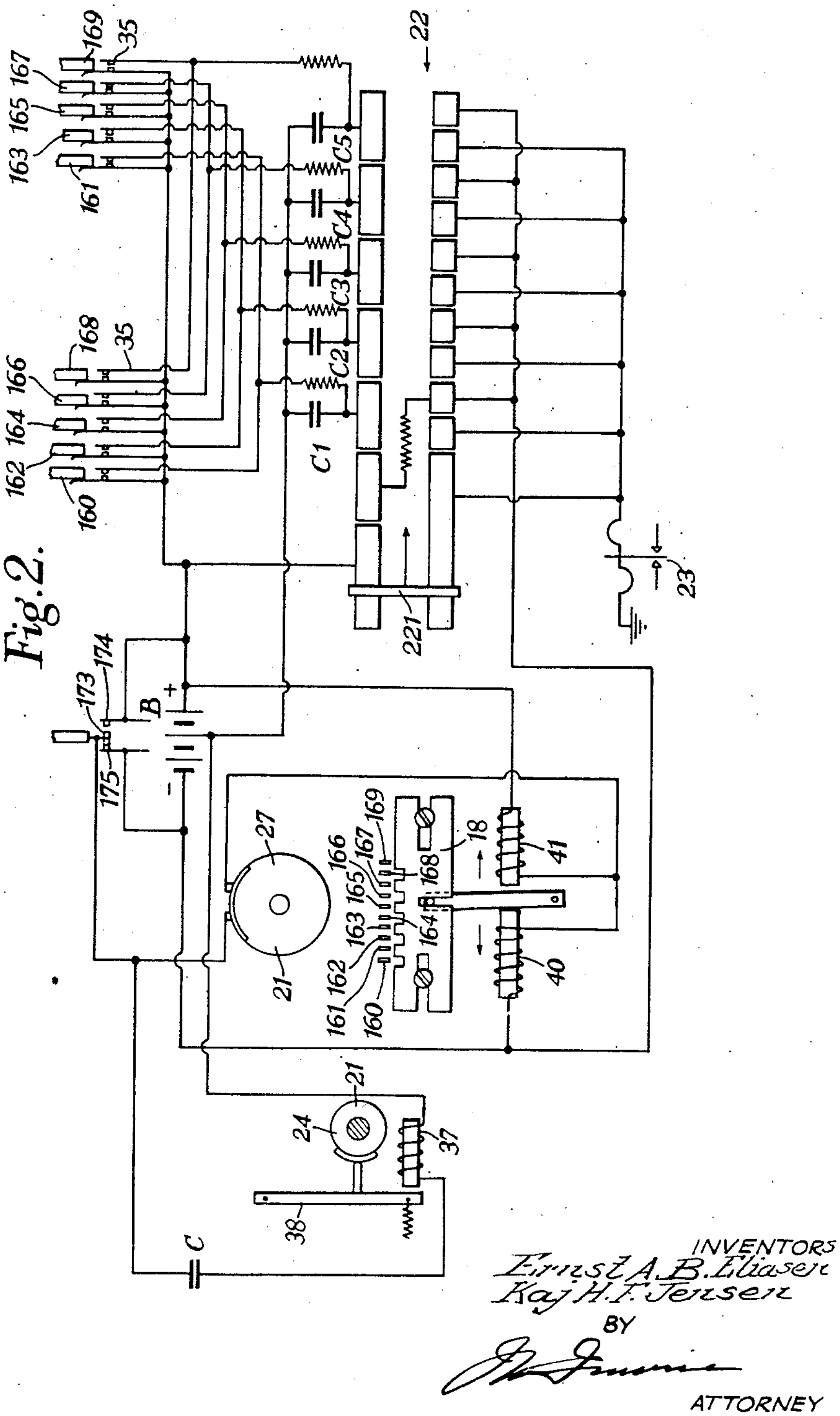
Fig. 2 is a circuit diagram explaining the operation of the apparatus.

Referring now to Figs. 1 and 2 the method of operation of the apparatus will be more fully described; thereafter mechanical features of a machine operating in the manner described will be explained. A main shaft 21 is driven at a regulated speed suitable for the transmission of five-unit code signals by means of the commutator 22, the latter controlling the operation of a line relay 23 indicated in schematic form, and each revolution of the shaft 21 comprises one operating cycle of the mechanism. A cam on the shaft 21 lifts all the cranks 15 at the commencement of the cycle and a new section of the tape is fed to the detection position, while a further cam causes the detector pins to move towards the tape and to respond to the particular punching thereof for the next symbol after which those pins which have entered punch holes in the tape cause the levers 12 to rotate selectively one or more of the discs 10. The cranks or arms 15 are now released and the crank 15, as selected by the discs 10, is allowed to move inwardly.

Thereafter the cam 26, by the follower 30, lever 31 and connector link 32 moves the pull-back bar 33 out of engagement with the lugs 160 to 169 of the discs 16 thereby freeing them for movement. Alternate lugs are however in engagement with the teeth of the blocking slide 18 and hence are not free to move. In Fig. 2 only the lugs 160, 162, 164, 166 and 168 (the even number group) are free to move and it will be assumed that these lugs pertain to the discs 16 representing the letters. If the crank which has moved corresponds to a letter and follows other letters one or more of the lugs of the even number group move as controlled by the arrangement of the teeth of the said group of discs 16 and by the particular crank or arm 15 which has been displaced. The movement of the so-selected discs permits, by the lugs concerned, the closing of one or more of the switches 35 resulting in charging one or more of the condensers C1 to C5 from the battery B. The brush 221, moving over the segments of the commutator 22, is driven from the shaft 21 and discharges those of the condensers C1 to C5 which have previously been charged, into the line relay 23 which thus reproduces the signals in time five-unit code form into the line. The upper series of commutator segments includes segments to start and stop the receiver mechanism in normal manner and five segments respectively connected to the condensers C1 to C5; the lower series of segments includes half sections connected alternatively to the relay 23 and to the battery B so as to ensure the complete discharge of all the condensers after passage of the moving wiper 221.

In the event of the detection of a numeral symbol on the tape 13 a crank 15 will move which results in the displacement of the shift selector disc 17 as already explained. A lug 171 on said disc 17 is subject to the action of a bias spring 172 which tends to retain the disc in either set position and the contact element 173 of lug 171 changes over from contact 175 to contact 174. These contacts are connected to the two ends of the battery B which is centre tapped, the centre being connected through the tape feed blocking magnet 37 and the condenser C to the contact 173. It will be seen that whenever the contact 173 changes its position, current will flow into the condenser momentarily to effect charging in one sense or the other, and such current flow is sufficient to effect the attraction of the armature 38 of the tape stop mechanism and the latter is held in the attracted position for the residue of the operating cycle by the residual magnetism. At or towards the end of the operating cycle a cam 24 on the main shaft 21 moves the armature 38 into its normal position permitting the tape feed mechanism to operate in its normal manner.

The movement of the crank 15 concerned (now one of the numeral cranks) permits the transmission of the requisite common shift key impulse by the letter discs 16, which still remain free to move since the blocking slide 18 has not yet operated. The notching of the group of letter discs 16 is so chosen that the movement of any numeral arm 15 will result in the transmission of the same common five-unit code, namely the shift key selector code which prepares the receiving instrument for accepting numerals at the next code period.

After the transmission of the shift selection code the pull back bar 33 has returned all the lugs 160 to 169 to their starting position in normal manner and immediately thereafter a conductive segment of rotary switch 27 completes a circuit from contact 173 and through whichever of the two blocking slide operating magnets 40, 41 is connected by the contacts 174 or 175 engaged by the contact 173. This connection of the magnets 40 or 41 occurs at each cycle of the machine but it will be seen that whenever the disc 17 changes position the magnet previously inoperative comes into use and reverses the blocking slide 18. In the Fig. 2 position it has been assumed that the magnet 40 has previously been in use for blocking the discs 16 of the numeral group and is shown in that position; however following the movement of contact 173 into the position shown magnet 41 will be energised through the rotary switch and will shift the blocking slide 18 to its alternative position blocking the letter group of discs.

Hence at the commencement of the next cycle of operations of the apparatus the tape feed, which was previously blocked by the action of the electromagnet 37, leaves the tape in its former position and prevents the next character from being brought into the detection position, meanwhile the common shift selection five-unit code signal has been transmitted. Exploration of the same tape character is now repeated at the next cycle of operation of the machine and accordingly the same crank 15 will again move. Now, however, only the numeral group of discs 16 is free to move and the discs transmit the correct five-unit code for the numeral concerned. If, after the receipt of one or more numerals, a letter is detected on the tape 13 the operations previously described are repeated; the shift selector disc 17 returns to its former position, energising the tape feed blocking magnet 38 and preventing the regular tape feed action, the numeral discs 16 (being now engaged by a crank 15 corresponding to a letter) transmit the correct common shift selection five-unit code to reset the receiving apparatus for letters. The action of disc 17 also reverses the position of the blocking slide 18 thereby freeing the letter group of discs 16 and, at the next operating cycle, causing the transmission of the particular code characteristic of that letter.

Figure 3:
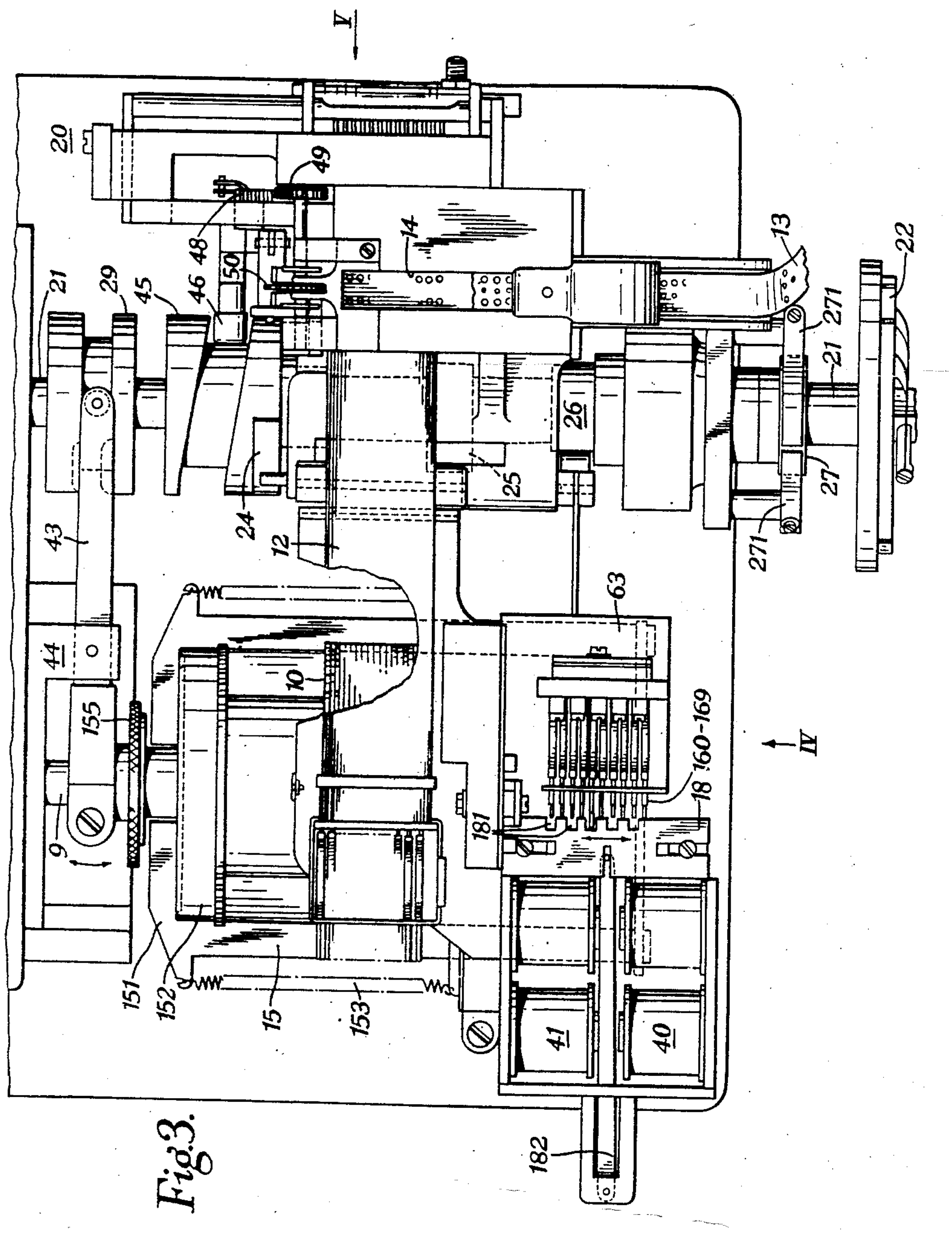
Fig. 3 is a plan view of a constructional form of the apparatus.
Figure 4:
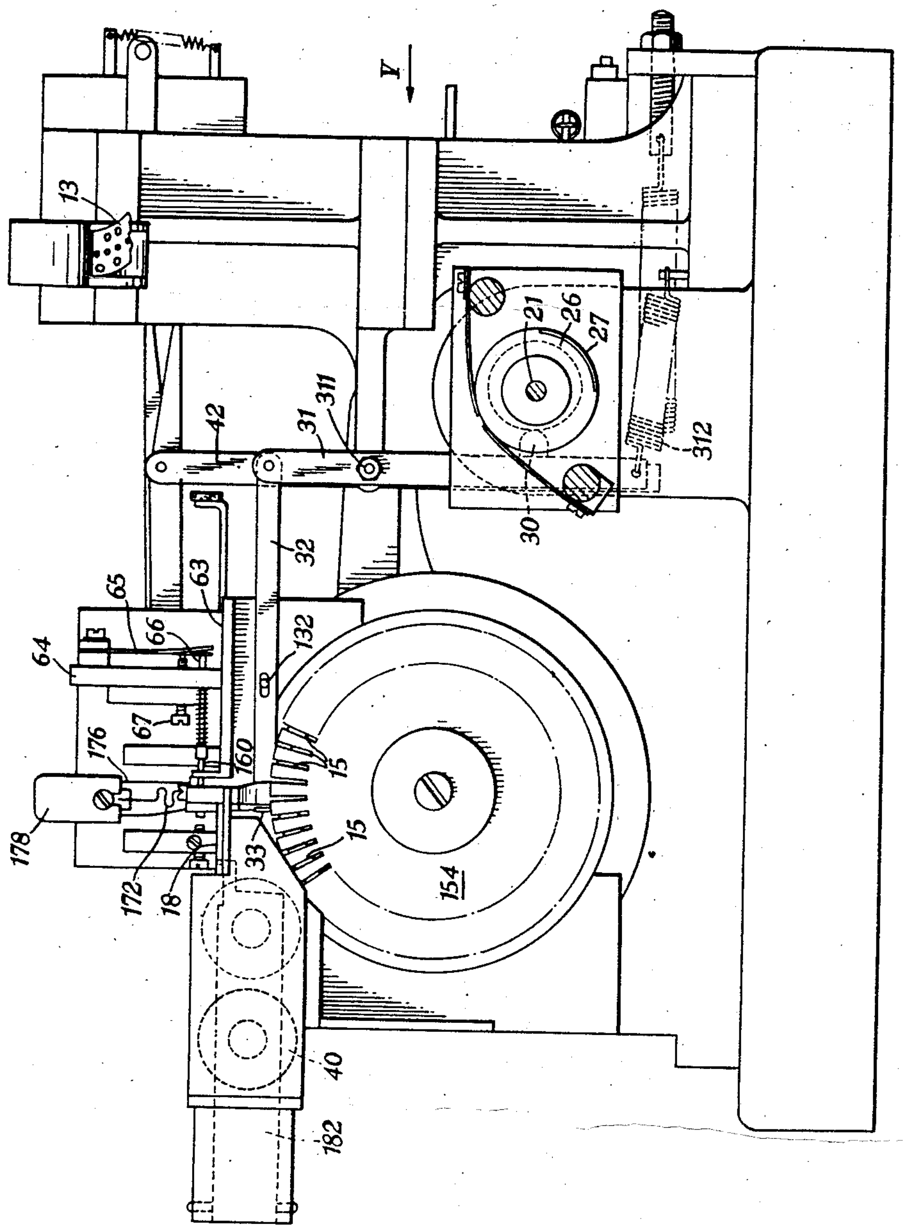
Fig. 4 is an end view of Fig. 3 in the direction of the arrow IV in Fig. 3, the five-unit commutator disc being removed.

Figs. 3 to 8 of the drawings show a constructional embodiment of a translating machine incorporating the features of the invention, which, as already mentioned, is constructed as a modification of a Wheatstone printer. The base plate 20 supports the carrier rod 9 for the notched discs 10 as well as the shift selector disc 17 and the two groups of five unit discs 16. On Fig. 3 some of the bell cranks 15 have been omitted for greater clarity but it will be understood that they are spaced uniformly around the discs except for the small segment occupied by the lugs 11, by the lug 171 and by the lugs 160 to 169 of the various sets of discs mounted on the carrier 9. These cranks 15 are provided with inwardly directed ends 151 engageable by an axially movable collar 155 which is adapted to lift periodically all the cranks 15 out of engagement with the discs, the cranks being mounted for pivotal movement in notches in a support ring 152 on the carrier 9 and being subjected to springs 153 tending to engage the cranks or arms with the several sets of discs. The other ends of the cranks are guided in a slotted disc 154 (Fig. 4).

Reciprocation of the collar is effected once per operating cycle by means of a cam 29 on the main shaft 21, which is driven at an exactly regulated speed by means not shown, said cam operating the collar 41 through a lever 43 pivoted in a fixed bracket 44.

Figure 6:
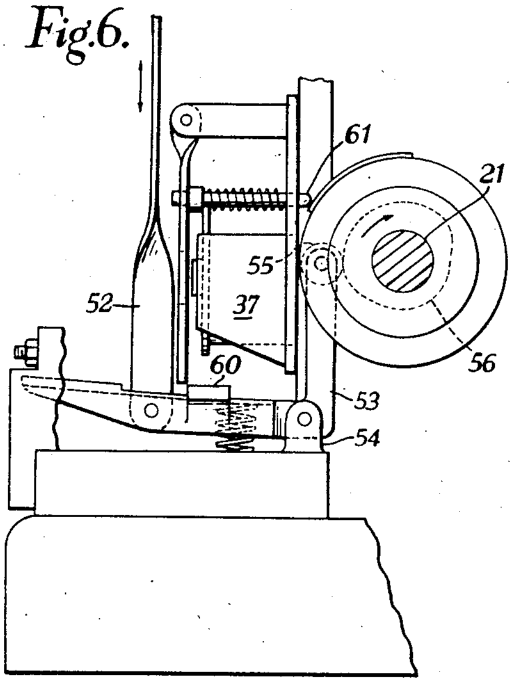
Figs. 6 and 7 are sectional views on lines VI—VI of Fig. 5, showing the tape stop mechanism in its two positions.
Figure 7:
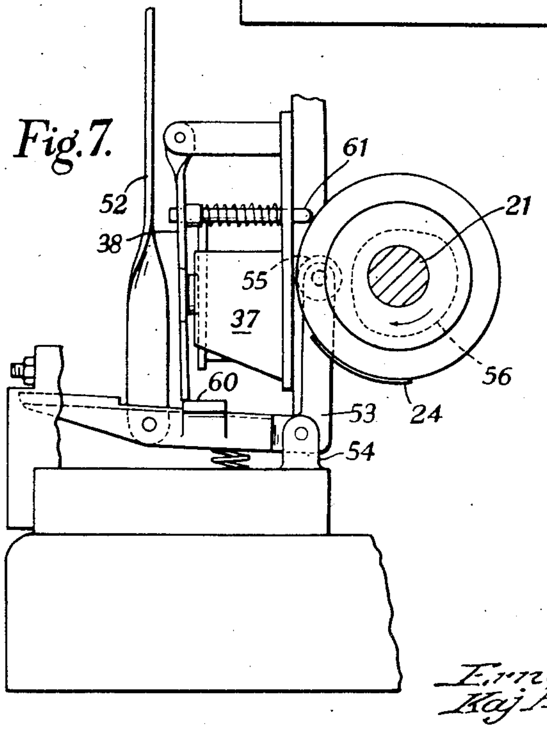

The periodic feed of the paper tape 13 is effected by means of a cam 45 having a groove in engagement with a follower 46 on a lever pivoted at its base in a bracket 46a and connected to an upwardly directed spring blade arm 47 connected to a rack 48 at the upper end adapted to be brought into engagement with a pinion 49 driving a tape feed sprocket 50. This engagement is effected by means of a vertically reciprocable rod 52 actuated by means of a crank 53 pivoted in a bracket 54 and carrying a follower 55 in engagement with a cam 56 on the main shaft 21 (Figs. 6 and 7). This arrangement of the tape feed mechanism follows normal practice, and the action is that the rack 48 is engaged with the pinion 49 for the sweep of the rod 52 in one direction, while it is disengaged for the sweep in the other direction; hence the tape 13 is always fed in the same direction.

The group of detector levers 12 are slidably associated with probing pins adapted to be presented vertically to the tape after each tape feed action and which by their movement tilt the selected levers 12 to effect selective rotation of the Wheatstone discs 10 through the lugs 11 on reciprocation of the lever group 12 by the arm 42 Fig. 4. The probing pins are advanced towards the tape after the tape feed operation by a cam not shown and thereafter the group of levers is advanced towards the discs 10 by the cam 25 shown in Fig. 1, in such manner that the levers associated with those pins which have been allowed to rise by encountering punch holes in the tape, effect selective rotation of those discs 10 corresponding to the punch holes. Thereafter in the operating cycle, the collar 155 allows the cranks 15 to move inwardly and one of them, determined by the slotting of the discs 10, is allowed to move inwardly to a sufficient extent to to become operative in respect to the five-unit discs 16 as explained below. Thereafter the levers 12 return to the original position and the probing pins are withdrawn from the tape ready for the tape feed action.

Figure 5:
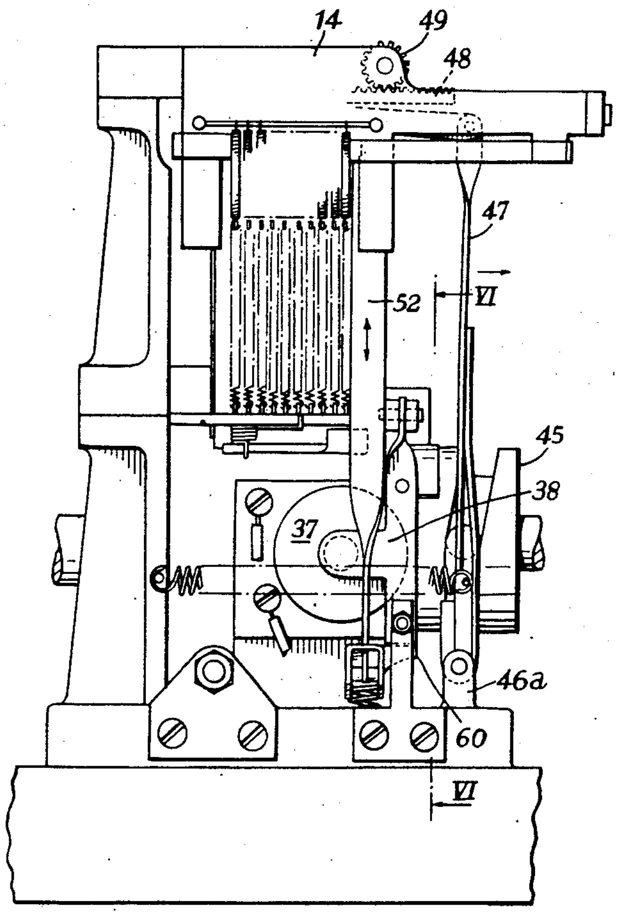
Fig. 5 is an end view looking in the direction of the arrow V in Figs. 3 and 4.

The features incorporated in the machine in accordance with the invention will now be described and reference will first be made to the action of the tape feed blocking system. Referring to Figs. 5, 6 and 7, it will be seen that the magnet 37 has an armature 38 the base of which is adapted to seat against a lug 60 on the crank 53 (Fig. 7) thereby holding the latter in its lower position and preventing the rise of the rod 52 which, as already explained effects the engagement of the rack 48 and pinion 49. Until the electromagnet 37 is energised however the armature 38 lies out of the path of the lug 60 as in Fig. 6, and hence the normal tape feed action continues. When, due to the action of the shift selector disc 17 and contacts 173 and 174 or 175, the electromagnet 37 is energised, the armature 38 is brought to the Fig. 7 position which prevents the rise of the rod 52 and the engagement of the rack 48 with pinion 49; thus interrupting the tape feed action. The armature 38 is held in contact with the pole face of the electromagnet by the residual magnetism, which may be enhanced by arranging for a small constant current to flow through the magnet coil or through an independent high resistance winding, and it is pushed free from the pole face once per cycle by the action of the cam 24 and a spring pressed push-off plunger 61 so that the tape feed is interrupted only for one working cycle after each movement (in either direction) of the disc 17.

The shift selector disc 17 is provided, in the arrangement shown, with regularly spaced teeth of pitch equal to twice the spacing of the cranks 15, since the letter and numeral cranks 15 are arranged alternately as shown in Fig. 8. The disc 17 is movable through a limited angle, and the contacts 174, 175 are mounted on spring blades 176 engageable with fixed limit adjusting screws 177. The blades 176 are mounted in a holder 178 which also supports the biasing spring 172 exerting a radially directed force capable of holding the disc 17 in either position as defined by the stops 177.

The two groups of five-unit discs 16 are arranged in alternate sequence of letter and numeral discs and the lugs 160 to 169 thereof project upwardly through a platform 63 carrying a contact support 64 carrying a set of ten spring contact blades 65. Each of the latter is in engagement with a spring pressed plunger 66 bearing at its other end against one of the lugs 160 to 169 and in such manner that the contact blades 65 are flexed away from the support 64 at their lower ends. Ten insulated contact screws 67 make electrical contact respectively with the blades 65 when the latter are unflexed. The pull-back bar 33, by movement in a direction towards the lugs 160 to 169, brings all the lugs into alignment and through the plungers 66 flex all the contact blades 65 out of contact with the screws 67. This action occurs once per cycle after the selected discs 16 have been allowed to move by the action of the selected crank 15 and in effect "prepares" the apparatus for the next selection. It will be seen in Fig. 4, that the bar 33 is reciprocated by a connecting bar 32, a slot in which is slidably and rotatably accommodated on a pivot 321. The lever 31 reciprocates the bar 32 and is pivoted to a fixed bracket at 311 and is subject at its lower end to a spring 312. A follower lug or pad 30 runs in contact with the cam 26 to effect the cyclic operation of the pull-back bar 33 through the integers referred to.

The blocking member 18 is slidably mounted on the platform 63 and is notched at 181 in such manner that in one position of the member one group of alternate discs 16 is allowed to move, while in the alternative position the other group is allowed to move. Displacement of the member 18 is effected by the magnets 40, 41 which act on an armature 182, the latter being provided with a pin engaging a slot in the member 18.

As will be seen in Fig. 3 the rotary contact member 27 is provided at the end of the main shaft 21 and it includes a conductive segment which completes the circuit between the two spring contact blades 271 for the purpose of initiating the movement of the slide 18 after displacement of the disc 17 at such a point in the cycle that the lugs 160 to 169 are all in the normal position by the action of the pull-back member 33. The extremity of the shaft 21 carries a rotary wiper blade movable over the segments of the commutator 22 which transmits the five unit code impulses to the line relay 23 in correct time sequence and in well known manner.

*Operation*

Each revolution of the main shaft 21 represents one cycle of operation of the machine and each such cycle comprises the following operations:

*a*. The detection or probing of the character recorded on the tape 13 and brought into the working position in the guide 14.

*b*. The release of the bell cranks 15 to permit a selected one of said cranks to move as determined by the formation of the discs 10 and by the selective movement of one or more of the latter by the punch holes in the tape in the working position.

*c*. The release of the lugs 160 to 169 of the five unit discs 16 to allow the selected discs to move, as determined by the blocking slide 18 and by the particular crank 15.

*d*. The charging of the condensers C1 to C5 as selected by the lugs 160 to 165.

*e*. The application of the stored charges in the selected condenser or condensers in timed order to the line relay 23 by the action of the wiper on the commutator which may in fact occur during the next following working cycle.

Within the course of the working cycle referred to the following also occur:

*f*. The lugs 160 to 169 are returned to their normal position by the pull back bar 33.

*g*. The collar 155 brings the cranks 15 back to normal.

*h*. The probing pins engaging the holes in the tape 13 are brought back to their down position.

*i*. The tape feed is effected through the action of the integers 45, 46, 47, 48, 49, 50, 52, 53, whereafter the cycle repeats.

The foregoing is applicable in the case where a sequence of letters or a sequence of numerals or signs is being translated. If following a letter a numeral is detected by the means described or, contrariwise, a letter is detected following a numeral the following additional events occur.

A. Since in the preferred arrangement letter-representing cranks 15 alternate with numeral-(or sign) representing cranks 15, the disc 17 is shifted to its alternative position on the occurrence of the change from letter to numeral or vice versa.

B. The tape feed blocking magnet 37 prevents rise of the rod 52 and the tape feed is made inoperative by preventing engagement of the rack 48 with pinion 49; consequently the same crank 15 as before moves in the next following working cycle.

C. The movement of the crank 15 in the earlier working cycle results in the transmission by the disc group 160 to 169 already in use, as determined by the blocking slide 18, of the five-unit code impulse which is required to re-set the receiver mechanism for the changed character of the symbol.

D. After the movement of the disc 17, the contacts 174, 175 reverse the connections to the magnets 40, 41 as soon as the rotary switch 27 completes the circuit to them, which occurs as soon as the lugs 160 to 169 have been brought back to their normal position. In consequence the slide 18 changes over so that at the next following working cycle the same crank 15 as before, being again in the operative position, now permits the transmission of the correct code to the relay through the action of the group of discs 16 which was previously blocked by the action of the slide 18.

E. At the next working cycle the cam 24 frees the tape feed mechanism which then continues to operate in the normal manner until the character of the symbols again changes.

Thus for example a message consisting of letters with single numerals interspersed would stop the machine immediately a numeral was detected, cause the transmission of the common shift key code signal for setting the receiver for printing numerals, and transmit the numeral concerned. On detection of the next symbol, assumed to be a letter, it would again stop the tape feed, transmit the common shift key symbol for re-setting the receiver to print letters and then transmit the particular letter.

What we claim is:

1. A machine for translating Wheatstone code telegraphic symbols recorded on punched tape into five-unit telegraphic signals there being a separate Wheatstone symbol for every telegraphic character whereas the five-unit signals are distributed, as for letters and for numerals or signs, in different groups of characters requiring the preliminary transmission of either of two shift key signals for a change from letters to numerals or signs or vice versa respectively; comprising a primary shaft, tape feed means operable stepwise once per revolution of the shaft, a plurality of a detector elements presented once per cycle to the punched tape to detect the position of the punched holes therein, means responsive to the action of such elements to control the operation of selector combs, cranks selected by the action of such combs in such manner that one crank is free to move for each recorded symbol on the tape, means responsive to said selected crank to effect the transmission of five-unit code signals, said means comprising two element groups, for letters and for numerals or signs respectively, means to hold either group from operation, a shift selector disc operable by said cranks only when a symbol of one group is detected following a symbol of another group, means to stop the tape feed acting after each movement of the shift selector disc, and means whereby, after such stoppage, the common shift key signal is transmitted by the element group previously in use whereafter said group is made inoperative and the other element group made operative, the said second element group then transmitting the characteristic five-unit signal for the detected symbol.

2. A machine for translating Wheatstone code telegraphic symbols recorded on punched tape into five-unit telegraphic signals, there being a separate Wheatstone symbol for every telegraphic character whereas the five-unit signals are distributed as for letters and for numerals or signs, in different groups of characters requiring the preliminary transmission of either of two shift key signals for a change from letters to numerals or signs or vice versa respectively; comprising a primary shaft, tape feed means operated stepwise once per revolution of the shaft, a plurality of detector elements presented once per cycle to the punched tape to detect the position of punched holes therein, actuator rods reciprocated once per revolution of the shaft, said actuator rods being associated with said detector elements, a plurality of selector combs, actuated by said actuator rods as selectively moved by said detector elements, bell cranks adapted to be presented to such combs in such manner that one crank is allowed to move for each recorded symbol on the tape, five-unit combs controlled by said selected crank to permit the transmission of the five-unit code signals characteristic of the said respective cranks, said combs comprising two element groups for letters and for numerals or signs respectively, means to hold either group from operation alternately, a shift selector disc operable by said cranks only when a symbol of one group is detected following a symbol of another group, means to prevent the tape feed from operating for one revolution of the primary shaft after each movement of the shift selector disc, means whereby, after such stoppage, a common shift key signal is transmitted by the element group previously in use whereafter said group is made inoperative and the other element group made operative, the said second element group then transmitting the characteristic five-unit signal for the already detected symbol which through, the stoppage of the tape feed is still in the detecting position.

3. A telegraphic code translating machine according to claim 2 wherein the bell cranks representing the two groups of characters are arranged alternately in a circular track and the shift selector disc includes teeth with inclined flanks so that as long as a series of letters are being translated the disc is not displaced, but as soon as a numeral or sign is detected the disc is moved through a small angle to a new position in which it remains as long as numerals or signs are received, returning however, to its former position as soon as a letter is detected.

4. A telegraphic code translating machine according to claim 3 wherein the shift selector disc includes a lug movable between stops and adapted to operate either of two contacts and wherein spring means is provided adapted to bias the disc into either of said positions.

5. A telegraphic code translating machine according to claim 3 wherein the shift selector disc operates a pair of contacts in its two end positions which contacts are connected in parallel one with the other and in series with a current source the circuit also including a condenser and an electromagnet, so that the latter is energised whenever the disc changes its position, said electromagnet preventing operation of the tape feed for one cycle of operation of the machine and including an armature held in the working position stopping the tape feed by residual magnetic effect, and being reset to inoperative position by mechanical means once per operation of the primary shaft.

6. A telegraphic code translating machine according to claim 2 wherein the two groups of five-unit selector combs are arranged alternately and each comb includes a lug, the lugs being all brought back to an inoperative position once per revolution of the primary shaft by means of a press-back bar and then released to allow movement of those lugs which are allowed to move, firstly, by the action of the bell crank which has already been allowed to move by the action of the first-mentioned selector combs and, secondly, are furthermore allowed to move by the action of the means which hold either group of combs.

7. A telegraphic code translating machine according to claim 2 comprising a pressback bar to return all the five-unit combs to an inoperative position once operating cycle and thereafter permit movement of them as determined by the movement of the selected bell crank, the five unit combs of the two groups aforesaid being disposed alternately one with the other, a slotted blocking slide positioned to prevent movement of either group according to the position of the blocking slide, electromagnets to actuate the blocking slide to either position and means for actuating said electromagnets after operation of the shift selector disc upon detection of a change from letters to numerals or signs or vice versa.

8. A telegraphic code translating machine according to claim 7 wherein the means for actuating the electromagnets comprises a current source, contacts operated by the shift selector disc in its two positions, and a contact device operated by the primary shaft, such that on displacement of the shift selector disc a circuit is prepared through the electromagnet previously out of use, and said circuit is completed at a point in the operating cycle when the press-back bar has moved all the five-unit combs to their inoperative positions, thereby reversing the blocking slide and permitting movement of that group of combs which was previously held out of use by the action of the blocking slide in its former position.

9. A telegraphic code translating machine according to claim 7 comprising a plurality of contacts operable by the five-unit combs, said contacts being held open when the combs are moved by the press-back bar, and means whereby the closing of one or more of said contacts, by displacement of the combs of either group, determined, as for groups, by the blocking slide and, as for individuals in said group, by the movement permitted by one bell crank, effects the application of five-unit signals to a line, the timing of the transmission of said signals being effected by a commutator operated by the primary shaft.

10. A telegraphic code translating machine according to claim 2 comprising a press-back bar to place all the five-unit combs in an inoperative position once per cycle, a blocking slide notched for engagement with lugs on said combs so that one group only of said combs can move at one time, a tape feed stop magnet which prevents operation of the tape feed mechanism for one operating cycle on detection of a change from letters to numerals or signs or vice versa, operation of said magnet being controlled by the displacement of the shift selector disc said displacement further preparing a circuit to reverse the blocking slide, which reversal occurs after the five-unit combs have been placed in said inoperative position, the movement of the crank initiating the movement of shift selector disc resulting in the transmission, by the group of five-unit discs previously in use, of the appropriate common shift key signal, which signal thus occurs in the normal operating sequence, while at the next operating cycle the same bell crank again moves and the other group of five-unit discs now being free, causes the latter discs to effect the transmission of the characteristic signal of the detected symbol at the next following operating cycle.

11. A telegraphic code translating machine according to claim 2 wherein the transmission of the five-unit signals, as determined by the movement of the five-unit combs allowed to move both by the bell crank and by the blocking slide controlled by the movement of the shift selector disc, is effected by the charging of five condensers connected to a line or to a line relay by the action of a commutator operated by the primary shaft, which times the application of the condenser charge to the line or to the relay according to the five-unit code transmission principle.

12. A telegraphic code translating machine for converting Wheatstone symbols on a punched paper tape there being a different symbol for each character, into five-unit signals having common code signals for pairs of characters, and consequently requiring the interposition of shift key signals before transmitting numerals or signs following letters or vice versa, comprising a primary shaft rotating once per operating cycle of the machine, cam means whereby said shaft initiates the probing of the tape to detect successive symbols recorded thereon, means whereby the probing of the tape results in the selective rotation of a group of notched Wheatstone selector comb discs, a plurality of bell cranks disposed around said comb discs, means to release said bell cranks for movement towards said discs once per operating cycle, one or other of said cranks being allowed to move inwardly by the permutational notching of said discs at each such release of said cranks, means to feed the tape to present a new symbol recorded thereon once per normal operating cycle, a toothed shift selector disc in operative relation to the group of bell cranks and arranged so that movement of any crank which requires the transmission of a shift key signal, effects a small rotary movement of the shift selector disc, in one direction or the other, contacts closed in either position of the disc, means to interrupt the feed of paper tape for one operating cycle after every displacement of said shift selector disc, two groups of five combs engageable by the cranks so that the fall of any crank permits limited rotation of one or more of said latter combs, a displaceable blocking slide including notches engageable with alternate of said latter combs, said slide thus blocking one group of five combs while freeing the other group or blocking the latter group while freeing the former group, said combs of one group being selected to transmit five-unit characteristic signals corresponding to one group of characters as well as the common five-unit shift key signal which in the event of a change from the first group of characters to the other, must be transmitted before transmitting the characteristic signal, while the combs of the other group are selected to transmit characteristic signals corresponding to the other group of characters as well as another common five-unit shift key signal, which in the event of a change from the second group to the first group must be transmitted before transmitting the characteristic signal of the first group, any punched character involving a change from one group to the other being thus probed twice in succession the first probing action resulting in the transmission of the shift key signal and the second probing action resulting in the transmission of the characteristic signal, means to restart the tape feed after each interruption thereof due to such a change in the groups of characters, means to reverse the blocking slide following the emission of any shift key signal to block the comb group previously in use, and means operated by the primary shaft to produce the timed emission of the five-unit signals according to the five-unit code principles.

ERNST AKSEL BORGE ELIASEN.
KAJ HERMAN FREDERIK JENSEN.

References Cited in the file of this patent

UNITED STATES PATENTS

| Number | Name | Date |
|---|---|---|
| 1,895,095 | Connery et al. | Jan. 24, 1933 |
| 2,228,417 | Spencer | Jan. 14, 1941 |
| 2,273,776 | Zurek | Feb. 17, 1942 |
| 2,458,144 | Bush | Jan. 4, 1949 |
| 2,518,405 | Van Duuren | Aug. 8, 1950 |